No. 881,176. PATENTED MAR. 10, 1908.
G. CLAUDE.
APPARATUS FOR THE LIQUEFACTION OF AIR.
APPLICATION FILED FEB. 23, 1906.
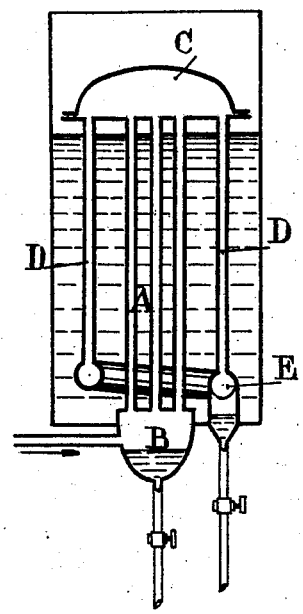
Witnesses:—
C. H. Crawford
F. G. Ebbs.
Inventor:—
Georges Claude
by B. Singh
Attorney

UNITED STATES PATENT OFFICE.

GEORGES CLAUDE, OF PARIS, FRANCE.

APPARATUS FOR THE LIQUEFACTION OF AIR.

No. 881,176.  Specification of Letters Patent.  Patented March 10, 1908.

Application filed February 23, 1906. Serial No. 303,129.

*To all whom it may concern:*

Be it known that I, GEORGES CLAUDE, manager of La Société l'Air Liquide, residing at Paris, France, 43 Rue St. Lazare, have invented certain new and useful Improvements in Apparatus for the Liquefaction of Air, of which the following is a specification.

This apparatus is composed principally of two series of tubes located in a vessel containing liquid air or oxygen. The first series of tubes is supplied with cold air under pressure, which air becomes partially liquefied therein, and the residual gas escaping therefrom is subsequently liquefied in the second series of tubes.

In the accompanying illustration I have shown by way of example a diagrammatic view of an apparatus embodying my present invention.

The apparatus consists broadly of a series of tubes A in communication with a lower collector B and an upper collector C: and of a second series of tubes D in communication with the collector C and with a lower collector E. These two assemblages of tubes are immersed in liquid air or oxygen and one of them, as for example A, is supplied with cold compressed air by one of the lower collectors, as B. This air in rising in the part A becomes partially liquefied and the liquefied portion falls into the collector B, from which it is drawn off to the exterior to serve the uses to which it is desired to put it.

In conformity with the process of partial liquefaction, as above described, this liquid portion which collects in B consists of a liquid rich in oxygen, the percentage of which may vary between 30% and 50% for example according to the installation and to the operative conditions.

The residue of the air which is poor in oxygen enters C and then passes into the second part of the liquefying apparatus, that is to say, into the series of tubes D, where it becomes liquefied and falls into the collector E. The liquid poor in oxygen, collected in E for employment in accordance with requirements may, if the conditions are favorable, that is, length of tubes in the series A and D considerable, and the velocity of the gas small, be composed of almost pure nitrogen.

What I claim and desire to secure by Letters Patent of the United States is:

An apparatus for liquefying air, comprising a series of upright tubes, a chamber at the upper end of said tubes and in communication therewith, a reservoir for collecting air liquefied in said tubes, means to admit air under pressure to said tubes, a second series of upright tubes in communication with the said upper chamber, a reservoir adapted to collect air liquefied in said second series of tubes and means surrounding said tubes adapted to maintain a refrigerating agent in contact therewith, substantially as described.

In testimony whereof he affixes his signature in presence of two witnesses.

GEORGES CLAUDE

Witnesses:
 HANSON C. COXE,
 EDMUND LECOUTURIER.